United States Patent
Chang et al.

(10) Patent No.: US 11,250,039 B1
(45) Date of Patent: Feb. 15, 2022

(54) EXTREME MULTI-LABEL CLASSIFICATION

(71) Applicant: A9.com, Inc., Palo Alto, CA (US)

(72) Inventors: Wei-Cheng Chang, Pittsburgh, PA (US); Hsiang-Fu Yu, San Jose, CA (US); Inderjit Dhillon, Berkely, CA (US)

(73) Assignee: A9.com, Inc., Palo Alto, CA (US)

( * ) Notice: Subject to any disclaimer, the term of this patent is extended or adjusted under 35 U.S.C. 154(b) by 193 days.

(21) Appl. No.: 16/211,707

(22) Filed: Dec. 6, 2018

(51) Int. Cl.
  *G06F 16/33* (2019.01)
  *G06F 16/903* (2019.01)
  *G06N 20/00* (2019.01)
  *G06K 9/62* (2022.01)
  *G06F 40/30* (2020.01)

(52) U.S. Cl.
  CPC .... *G06F 16/3334* (2019.01); *G06F 16/90335* (2019.01); *G06F 40/30* (2020.01); *G06K 9/6256* (2013.01); *G06N 20/00* (2019.01)

(58) Field of Classification Search
  CPC .................. G06F 16/3334; G06F 16/90335
  See application file for complete search history.

(56) References Cited

U.S. PATENT DOCUMENTS

| | | | | |
|---|---|---|---|---|
| 8,515,212 B1* | 8/2013 | Bengio | ................ | G06K 9/6262 382/305 |
| 2011/0047163 A1* | 2/2011 | Chechik | .............. | G06F 16/7867 707/741 |
| 2012/0047135 A1* | 2/2012 | Hansson | ............... | G06F 16/338 707/731 |
| 2014/0279622 A1* | 9/2014 | Lamoureux | ............ | G06Q 50/01 705/319 |
| 2015/0278358 A1* | 10/2015 | Abib | ..................... | G06F 16/951 707/706 |
| 2016/0034512 A1* | 2/2016 | Singhal | ................... | G06F 16/35 707/737 |
| 2018/0365220 A1* | 12/2018 | Chakraborty | ........ | G06N 3/0454 |
| 2019/0073426 A1* | 3/2019 | Balduccini | ........ | G06F 16/24578 |
| 2019/0138660 A1* | 5/2019 | White | ................ | G06F 16/9038 |
| 2019/0179796 A1* | 6/2019 | Lakhman | ............ | G06F 16/5838 |
| 2019/0212879 A1* | 7/2019 | Anand | ................ | G06F 16/9024 |
| 2019/0213284 A1* | 7/2019 | Anand | ................ | G06F 9/453 |
| 2020/0117739 A1* | 4/2020 | Bulut | ................... | G06N 3/0427 |
| 2020/0159773 A1* | 5/2020 | Chao | ....................... | G06F 17/16 |
| 2020/0349181 A1* | 11/2020 | Carbune | ............... | G06F 16/338 |

* cited by examiner

*Primary Examiner* — Eliyah S. Harper
(74) *Attorney, Agent, or Firm* — Hogan Lovells US LLP

(57) ABSTRACT

A contextual label compression framework is presented that uses trained sequence to sequence models. A set of training data including received queries and related content can be processed to generate sequences of semantic encodings. These sequences can be used to train the sequence to sequence models, in order to be able to predict queries for instances of content when the relevant information for those instances is processed by the model. When such information is received for an instance, that information can be processed to generate a semantic encoding sequence which can then be processed by the model. A resulting semantic sequence output by the model can be segmented and decoded to produce a set of relevant queries for the instance of content. This information can then be provided to an entity associated with the instance of content for purposes in managing aspects relating to that content.

18 Claims, 7 Drawing Sheets

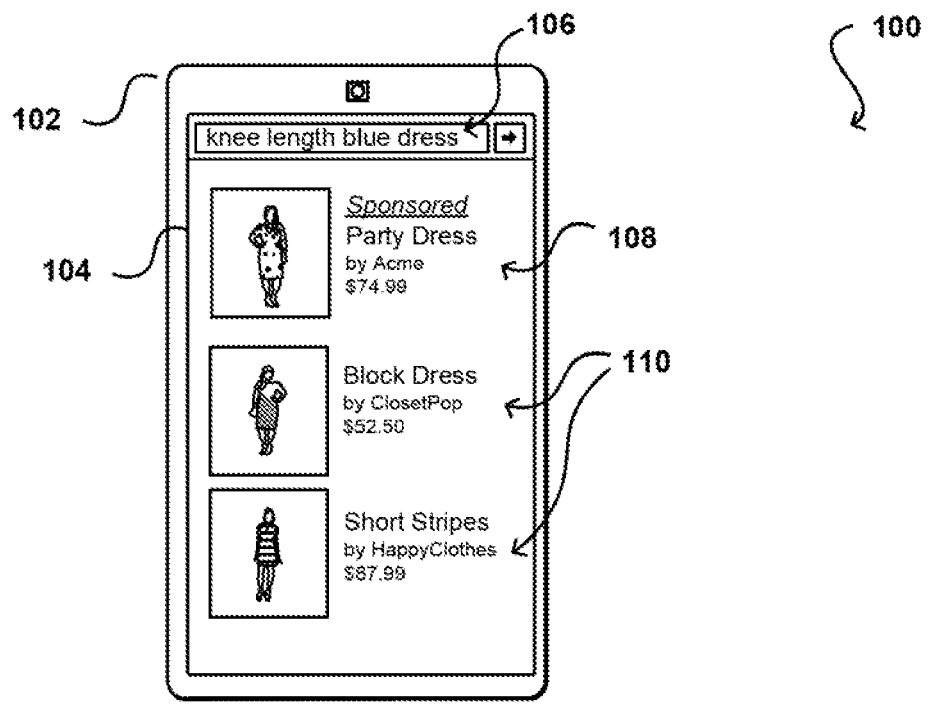

FIG. 1

Item title: ACME 4 in 1 12x Zoom Telephoto Lens + Fisheye + Wide Angle + Macro Lens with Phone Holder + Tripod for Smartphone Generated Queries
zoom lens for smartphones
smartphone plus telephoto lens
smartphone x zoom lens
smart phone zoom lens
telephoto lens for smartphone
cell phone telephoto lens
phone telephoto lens
smartphone telescope
smartphone telephoto lens
telephoto lens for smartphone x
zoom lens for smartphone x
lux hd zoom...

FIG. 2

EXTREME MULTI-LABEL CLASSIFICATION

BACKGROUND

Users are increasingly consuming content electronically, such as by accessing digital content provided over the Internet or another such network. Users often rely upon search queries or keyword strings that can be used to identify potentially relevant content. Users may utilize a variety of different queries when searching for the same type of item. It is often the case that various entities would like to be able to determine or predict the queries that users would use to locate specific content, but in situations where the potential keywords are unlimited the predictions can be inaccurate, particularly where the data is sparse for a particular instance or type of content.

BRIEF DESCRIPTION OF THE DRAWINGS

Various embodiments in accordance with the present disclosure will be described with reference to the drawings, in which:

FIG. 1 illustrates an example selection of content that can be provided in response to receiving a search in accordance with various embodiments.

FIG. 2 illustrates example queries that can be generated using information about an item in accordance with various embodiments.

DETAILED DESCRIPTION

Figure 3:
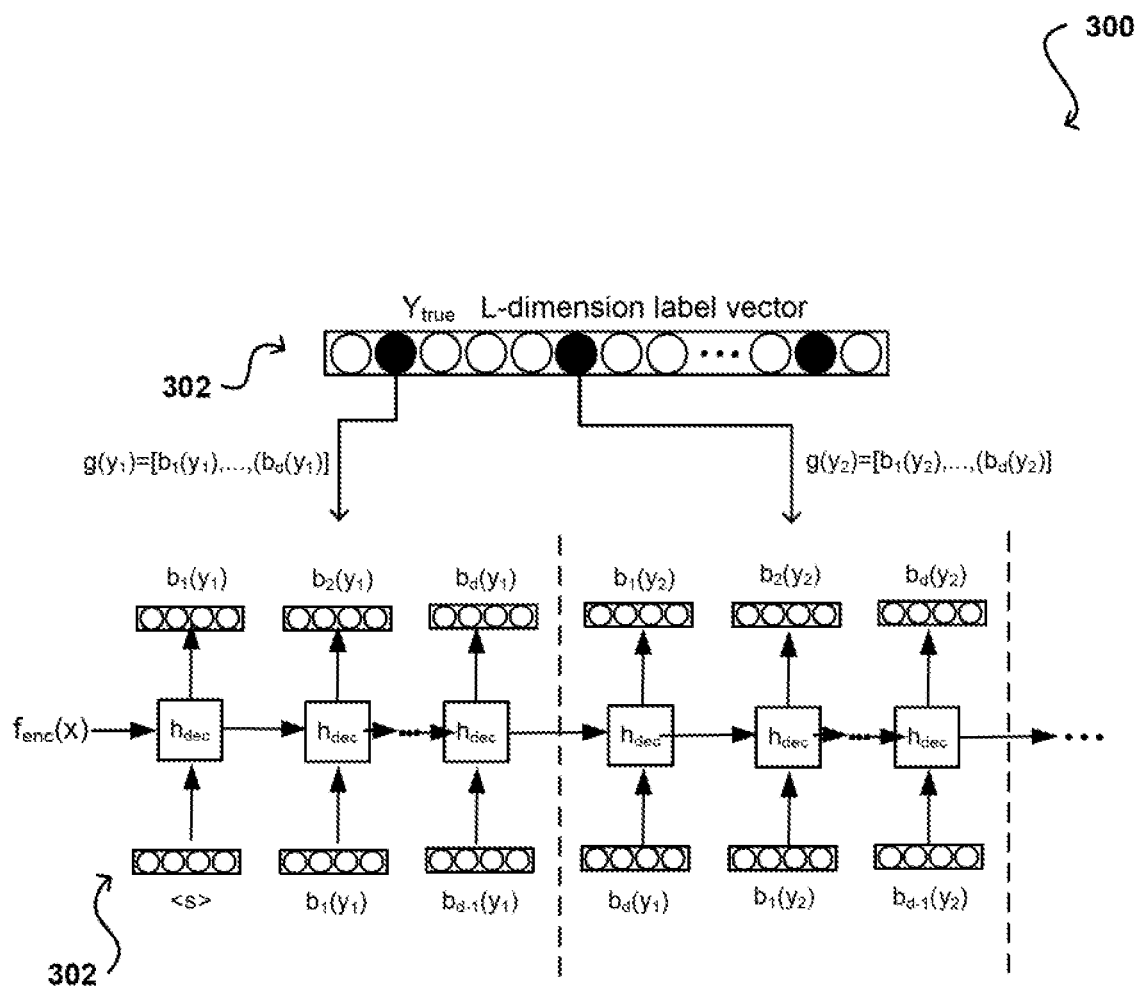
FIG. 3 illustrates an example framework that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to determining labels for instances of content in an electronic environment. In particular, various embodiments provide for the determination of relevant output sequences or labels for an instance of content based on information for that instance, such as textual information for a title or description of the instance. A contextual label compression framework is presented that uses trained sequence-to-sequence models. A set of training data including input sequences of received queries, actions, and/or related content can be processed to generate sequences of semantic encodings. These sequences can be used to train the sequence-to-sequence models, in order to be able to predict output sequences or labels (e.g., queries) for instances of content when the relevant information for those instances is processed by the model. Information received for an instance can be processed to generate a semantic encoding which can then be processed by the model. A resulting semantic sequence output by the model can be segmented and decoded to produce the desired output, as may relate to a set of relevant queries for the instance of content. This information can then be provided to an entity associated with the instance of content for purposes in managing aspects relating to that content.

Various other functions can be implemented within the various embodiments as well as discussed and suggested elsewhere herein.

FIG. 1 illustrates an example display of content 100 on a display screen 104 of a computing device 102. In this example a search query 106 has been received and a set of search results 108 determined and returned for presentation in response to the request. There are many conventional methods that can be used to locate content in such a way, and these will not be discussed herein in detail. In this example the user has submitted a query including the keywords or text query "knee length blue dress" and the returned search results 110 have been determined to be relevant in some way to the keywords. This can be due to a categorization of the results, keywords associated with the results, or tags applied to the result, among other such options. In some embodiments the keywords of the query can be used with a search index to identify relevant content based on one or more of those keywords, as may be determined using a relevance algorithm. The user can scroll or otherwise navigate through the results to determine whether any of the results are of interest to the user.

As illustrated, the content provided also includes at least one search result 108 referred to as a sponsored result. A sponsored result may be displayed with other search results as well, with the sponsored result being featured in some way. The featuring of the sponsored result may correspond to inclusion on an initial display of results, for example, and/or may include featured aspects relating to placement, color, font size, animation, video, audio, or other such features. An entity associated with, or providing, the content for the sponsored result may provide compensation or have some agreement with a provider of the search results wherein the sponsored result will be displayed, at least for a period of time or number of instances, for example, with the search query. The entity may pay for the association with the exact query, a portion of that query, a keyword, or a subset of the keywords of the query, among other such options.

For some items or instances of content, there may be a large number of keywords that are relevant to those items or instances, which can be submitted in an even larger number of combinations through search queries. It is possible to track the queries users utilize to locate specific instances of content, but the queries may number in the hundreds or thousands in some instance, if not more. Such monitoring also does not account for queries that might be submitted in the future, or queries for new items where data is not yet available. For some items there may not be enough data to accurately predict which queries are likely to be submitted to locate specific items.

If an entity wants to pay to have an ad or sponsored result displayed, the entity will have to determine the query, or queries, for which the entity should pay for a sponsorship. The entity will also want some indication of the number of views, presentations, or impressions, that are likely to result from such sponsorship. For example, the user entity might pay for "knee length blue dress" but would not get any exposure if a user searching for the same content instead submitted "women's summer attire" or another such query. Further, the entity might not want to pay a premium for a query that is likely to only be submitted a small fraction of the time.

It can therefore be desirable to attempt to determine the set of possible queries, or at least likely or relevant queries, and predict a likelihood or frequency of those queries being submitted by various users. As mentioned, historical data can be captured and maintained for a search provider, for example, wherein submitted queries can be stored and metrics tracked such that the frequency and number of such submissions over a given period can be determined. As mentioned, not all popular or relevant queries may have been received, particularly for new items or content, such that it may be desirable to attempt to predict which queries are likely to be received. For providers with hundreds of thousands or even millions of possible keywords and queries, however, it can quickly become complex and resource intensive to attempt to determine all relevant queries, keywords, or labels that could be relevant for a given instance of content.

In one approach, information about an item can be used to predict queries or other labels that might be submitted to locate content for that item. FIG. 2 illustrates an example prediction scenario 200 wherein title information for an item includes a number of different terms that can be used to generate potential queries of interest. Various other information (textual, action, or other) associated with the item can be used as well, such as may be pulled from descriptions, customer reviews, web articles, social media sites, and the like. Example actions may include any relevant action performed with respect to an item, as may relate to a view, purchase, download, addition to a virtual wish list, placement in a virtual shopping cart, forwarding, saving, and the like. This information can be processed, after any removal of stop words or duplication, etc., as well as the potential inclusion of related words, to generate a set of potential queries. Various models can be used to generate the potential queries based on combinations of the words determined for the item, as well as related words or terms as discussed herein. The queries can also pull from historical queries submitted for at least some of those terms, or to locate items relating to at least some of those terms, etc. As mentioned, however, this can produce a very large list of queries, and would not provide any information about predicted frequency or ranking of likelihood of receipt, without more information.

Approaches in accordance with various embodiments can attempt to transform content labels into semantic-aware codes, such as by treating an extreme multi-label classification (XMLC) as a sequence-to-sequence (Seq2Seq) formulation. A set of sequence-to-sequence (Seq2Seq) models can then be trained on these semantic codes. A semantic framework can be utilized that provides for improved training and inference time with respect to conventional approaches, while reducing model size and retaining competitive accuracy with respect to state-of-the-art XMLC approaches.

Extreme multi-label classification (XMLC) refers to the task of assigning an instance with the most relevant subset of labels from an extremely large label set, such as a data set that might include tens of millions of labels or more. A huge label space can involve challenges relating to data sparsity and scalability, as well as obtaining high accuracy. As mentioned, a search provider might recommend content for specific queries, including where sellers of sponsored products can bid on relevant queries for advertisement. Other entities may pay to have certain content displayed in response to receiving a specific query as well, where the content may be unrelated to products or services, but may instead relate to policies, communications, alerts, and the like. Approaches in accordance with various embodiments can formulate this task as an extreme multi-label classification (XMLC) problem, where the input can include information such as a title or heading for an instance of content. The system can analyze this information and output a set of relevant queries, such as the top-K relevant queries associated with the input content.

In various embodiments a framework of sequence-to-sequence (Seq2Seq) models is used for XMLC-related tasks. The Seq2Seq framework in some embodiments can handle large-scale labels, including queries on the order of million or more. Such a framework can also maintain reasonable inference time while attaining high accuracy. A number of different semantic label encoding techniques can be utilized as discussed herein, such as may include random projection trees, to represent a query as a sequence of codes. In one embodiment Binary Hoffman Tree encoding is utilized to generate the semantic encodings. The ability to represent a query as a sequence of codes can significantly reduces the output dimension in a final layer of a neural network-based classifier, such as the softmax layer. Such a framework not only has a competitive accuracy among representative baselines, but also enjoys faster inference time due to the constant model size with respect to the number of labels.

Conventional XMLC approaches primarily fall into three categories: one-versus-all, tree-based ensemble methods, and target embedding. One-versus-all methods learn one classifier for each label. Tree-based methods induce a tree structure which recursively partitions the instance space or sub-spaces at each non-leaf node, and has a base classifier at each leaf node which only focuses on a few active labels in that node. Different from traditional decision trees, on the other hand, the new methods learn a hyperplane to split the current instance space at each node, instead of selecting a single feature based on information gain (as in classical decision trees). Target-embedding methods address the data sparsity issue by finding low-dimensional embedding of the label vectors in the target space. Many variants of the target embedding methods have been proposed, which mainly differ in their choice of compression and decompression techniques such as compressed sensing, Bloom filters, landmark labels, error correcting output coding (ECOC), and more. Among those methods, SLEEC is considered representative as it outperformed competing methods on some benchmark datasets.

In order to improve upon these approaches, XMLC-related tasks have been attempted using different Seq2Seq approaches. In one such approach, the labels (or queries or actions, etc.) are decoded one at a time. This approach is not scalable to large-scale labels due to a bottleneck in the softmax layer. Another approach, utilizing token decoding, decodes the tokens one at a time. A sequence of decoded tokens can then form a plausible query. This could be disadvantageous, however, as the generated query may not be semantically valid, and may never have been received or utilized in a respective search engine.

Approaches in accordance with various embodiments can avoid these disadvantages while providing high accuracy. The size of the models utilized is scalable to the size of the label space. Further, unseen labels can be processed and ranked without acquiring new training data and retraining the relevant models. The label embedding can also be leveraged effectively for improved prediction power in at least some embodiments.

In various embodiments a united framework is utilized that incorporates label compression techniques into Seq2Seq models to efficiently solve the XMLC task. Given an instance (x, y) where l∈pos(y) denotes the positive labels such that $y_l=1$, and the low-dimensional label embedding $q_l \in R^k$, label l is now encoded as follows:

$$g(q_l)=[b_1(q_1),b_2(q_1), \ldots b_d(q_l)]$$

where g: $R^k \rightarrow R^d$ is a compressing function that outputs a sequence of w-nary codes with length d. An example realization is through random projection with simple uniform quantization. Random projection techniques can then be applied to the Seq2Seq models for performing XMLC-related tasks.

In various embodiments, label compression can be performed through pre-processing for the Seq2Seq models. As mentioned, in some Seq2Seq-label approaches the target is a sequence of positive labels. Instead of using the one-hot vector, a low-dimension embedding of label $y_{pt}$, denoted as $q_{pt}$, can be utilized, conducting random projection with uniform quantization on this label. The encoded target now becomes:

$$y=\{y_{p1}, \ldots ,y_{pt} \ldots ,y_{pT}\} \rightarrow \{g(g_{p1}), \ldots ,g(g_{pt}), \ldots ,g(g_{pT})\}$$

where $g(g_{pt})$ is the encoding function that outputs a length d sequence of w-ary codes.

After obtaining the encoded target sequence, the training procedure is identical to the Seq2Seq-label method as illustrated in the example proposed framework 300 of FIG. 3. For each positive label $y_l$ in the figure, it can be transformed using one or more functions g into a sequence of semantic codes $\{b_l(y_l), \ldots, b_d(y_l)\}$. The codes for all positive labels can then be concatenated into a longer sequence for training. The softmax layer now is much smaller O(W), which significantly reduces model size and increases the speed of training and inference time. In FIG. 3, a label vector is provided that includes three separate labels.

Figure 4:
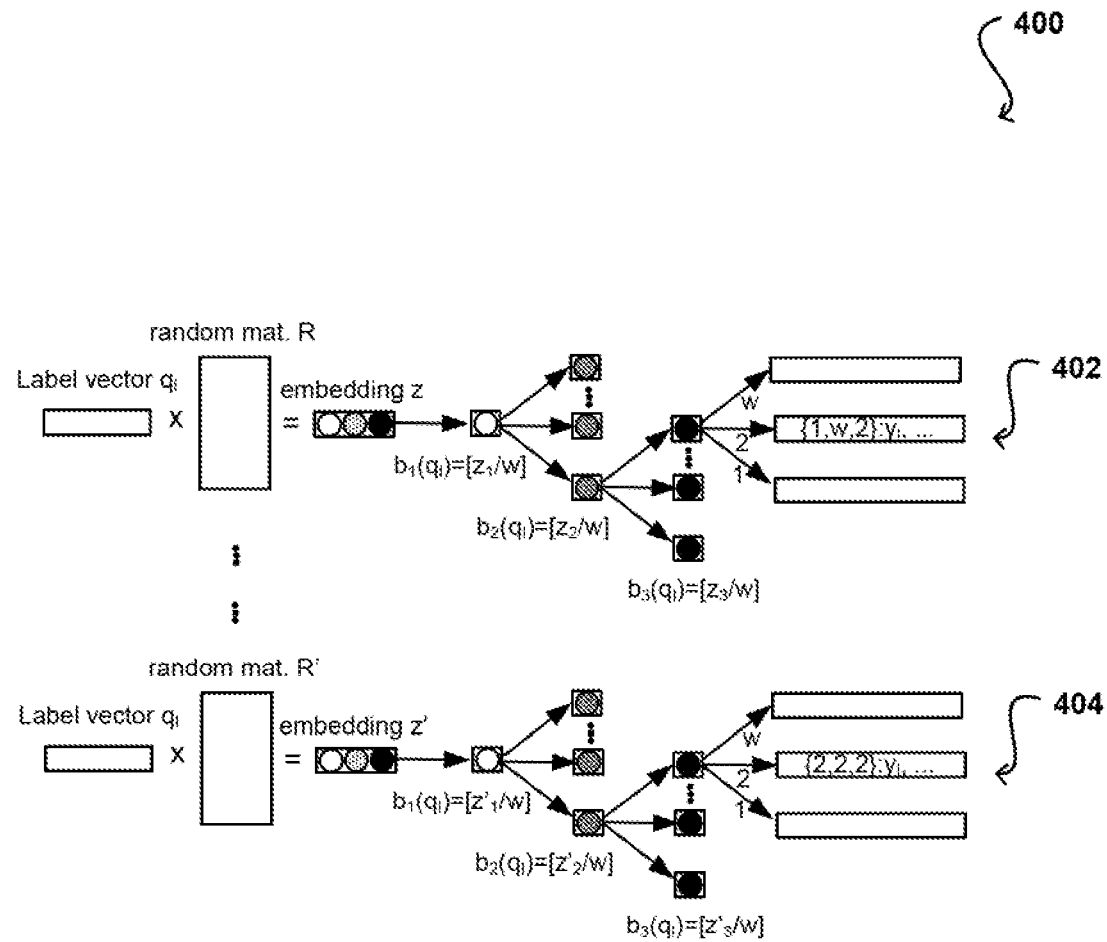
FIG. 4 illustrates an example instance of a function using a random projection tree that can be utilized in accordance with various embodiments.

Multiple random projection matrices can be sampled to create m different random projection tree encodings, where the example situation 400 of FIG. 4 illustrates the number of trees m=2. This is analogous to random forest where each tree refers to a model, and the prediction is done by ensembling the results of all trees. A similar benefit can be obtained in that m random projection trees encoding are trained by m different Seq2Seq-label models, and the prediction on top-k relevant labels is done by histogram count on the labels, ensembled among all m random projection tree decoded labels. A framework in accordance with various embodiments can readily incorporate the rich label side information, which is abundant in real-world applications. For example, a labels co-occurrence graph can be transformed into label embedding via various label propagation methods, such as DeepWalk. FIG. 4 illustrates an instance of g function using random projection tree. Given a label $q_l$, several semantic-aware embeddings are available such as instance indicator vector, word2vec embedding, Fasttext embedding, and more. In addition, an ensemble of m random projection trees can be utilized in some embodiments that leads m set of different semantic codes, and train the SeCSeqXML in parallel without any further cost.

In various embodiments, label decompression can be performed as a post-processing step. For example, a sequence random projection encoding might be produced by the Seq2Seq model, where each symbol is a w-ary code. In one example heuristic scheme, the predicted sequence can be segmented into chunks, ignoring the remaining codes at the end. For each chunk of length d subsequences, the subsequence can be traversed along the random projection tree to the leaf node. At the leaf node, a label histogram can be used for the code, which could be empty. The label histogram count can be accumulated for every chunk, outputting the top-k prediction. To generate the encoded sequence, one can resort to Monte Carlo sampling with temperature annealing or beam search heuristic, which can be used in the Seq2Seq model applied to neural network-based machine translation.

Such a label compression framework can provide various benefits. The model is smaller in size than in conventional approaches, and can be trained more efficiently. Since the training is done on the encoded target sequence, the size of the output softmax layer is significantly reduced. This encoding not only speeds up the training, but also helps to reduce the model parameters, which are both important concerns for the XMLC tasks. Such a framework provides for efficient inference. Inductive power is provided to predict new or unseen labels. Given a newly unseen label (i.e., query) that does not have any training instances, and given its embedding, the label can be encoded through a random projection tree, and posited into a leaf node. When decoding, this new label would appear if the Seq2Seq model frequently predicts the corresponding codes. This property can be extremely useful in certain applications as there is no need to retrain the model or collect additional training instances to be able to generate predictions for the unseen label. Such a framework also provides the ability to utilize label side information. An example framework can readily incorporate rich label-side information, which is abundant in the real-world applications. For example, a labels co-occurrence graph can be transformed into label embedding via various label propagation methods as discussed above.

Figure 5:
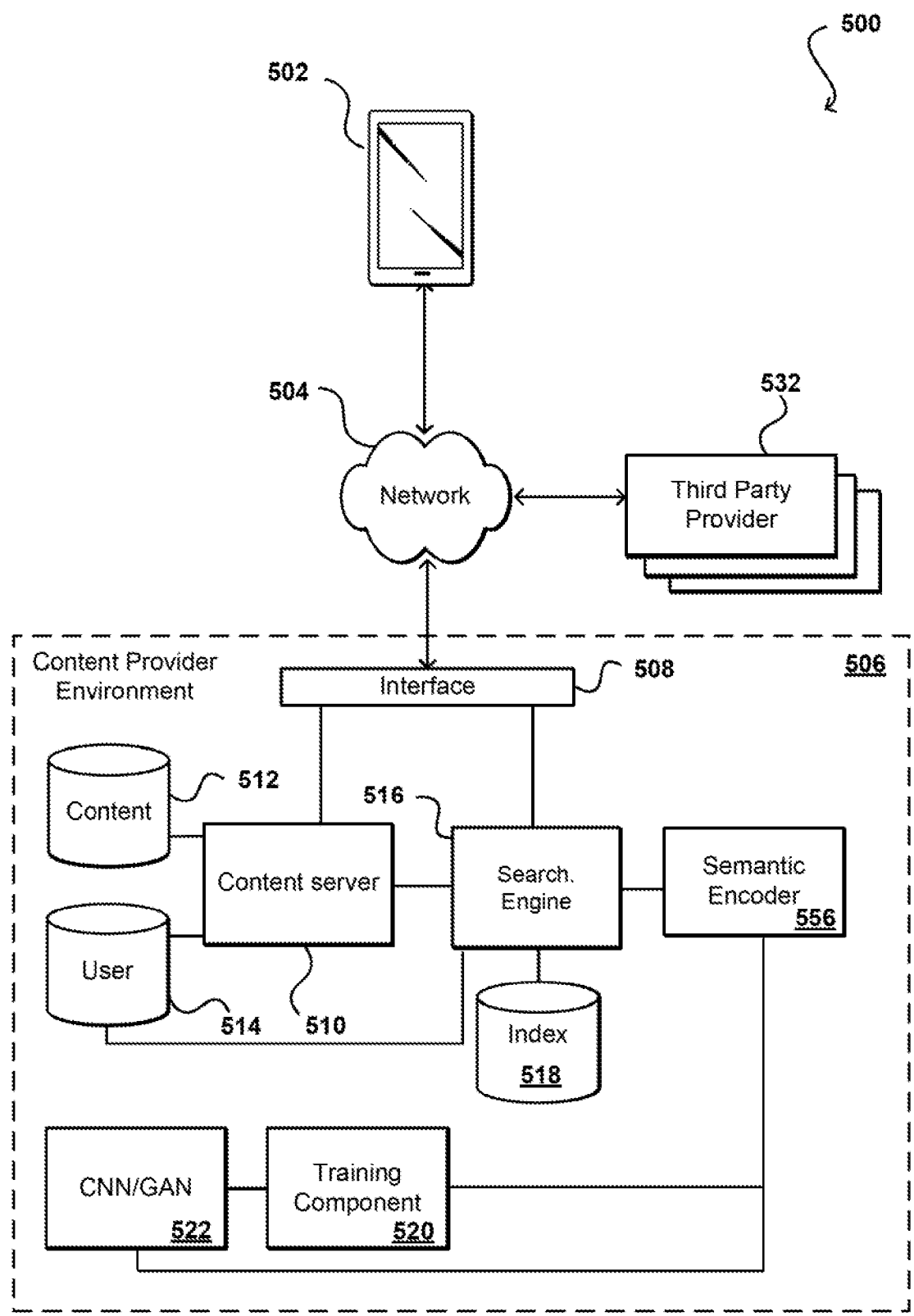
FIG. 5 illustrates an example system that can be used to implement aspects of the various embodiments.
process for performing a style-based search for content that can be utilized in accordance with various embodiments.

FIG. 5 illustrates an example environment 500 in which aspects of the various embodiments can be implemented. In this example, a computing device 502, such as a portable computing device of a user, is able to make a call or request across one or more networks 504 to a content provider environment 506. It should be understood, however, that in some embodiments some or all of the functionality may be performed on the computing device itself. The network(s) can include any appropriate network, such as the Internet, a local area network (LAN), a cellular network, an Ethernet, or other such wired and/or wireless network. The content provider environment 506, which can include any appropriate environment in which physical resources such as servers and databases are located and able to serve content, can include various types of resources for providing content from, or at least stored by, a resource provider, or other such entity.

In this example, a request received to the content provider environment 506 can be received by an interface layer 508 of the environment. As known for network environments, the interface layer can include components such as interfaces (e.g., APIs), load balancers, request and/or data routers, and the like. If the request is a request for content, such as for content for a search result page to be displayed in an application or browser, information for the request can be directed to one or more content servers 510 and/or content managers, which can obtain the content from a content data store 514 or other such repository to be sent back across the network(s) 504 to the computing device 502, or another indicated destination. In some embodiments, information for the request might also be compared against user data in a user data store 512 or other such location do determine, for example, whether the user has access rights to that content. In some embodiments user data might also be analyzed to determine which type of content to provide, additional supplemental content to provide with the primary content, and the like.

In various embodiments, the request may include or specify at least one query, or set of keywords, to use to locate relevant content. In response to receiving such a query, the query can be passed to a search engine 516, or other such system or service, that may be part of the environment or offered as a third party service, among other such options. The search engine can cause the query to be searches against an index 518, for example, in order to locate related content. Information for the content can be provided to the content server 510, which can cause the content from the content repository to be provided, or otherwise made available, to the client device through a search result page or other such interface. As mentioned, in some embodiments third party providers 532 might want to have one or more results returned to the client device in response to the received query. Accordingly, the third party providers might bid or provide payment to have specific content associated with specific queries. As mentioned, various approaches discussed herein can be used to determine queries for various items or instances of content, which can then be surfaced to the third party providers 532 to assist in determining the appropriate queries for which to provide associated content. Such information can also help to determine a fair amount or rate of compensation based at least in part upon the predictions.

The labels can be determined at least in part using neural networks 522 such as a conventional neural network (CNN) or generative adversarial network (GAN) to determine the appropriate labels as discussed herein. A training component 520 can perform the training on the models and provide the resulting results and/or trained models for use in determining the individual labels. In order to determine labels for various content items, in at least some embodiments, some analysis of content items in an electronic catalog or other data repository is performed to determine information about the items. In some embodiments, one or more feature descriptors or vectors can be generated to describe various aspects of an item.

A training component 520 can utilize the training data set to train the neural network 522. As further described, neural networks can include several learning layers in their architecture. A query image from the training data set is analyzed using the neural network to extract a feature vector from the network before the classification layer. This feature vector describes the subject and/or objects shown in the image. This process can be implemented for each of the images in the data set, and the resulting object feature vectors can be stored in a data store. In various embodiments, the resulting object feature vectors can be compressed for improved processing. For example, the attributes generated by the neural network may include feature vectors that have a large number of dimensions. The dimensions of these object feature vectors can be reduced by applying at least one of Principal Component Analysis (PCA) or Multi-Dimensional Scaling (MDS). Advantageously, such an approach can reduce storage demands and significantly improve latency performance. Additionally, such an approach can remove or at least reduce noise in the transformed space since the tailing dimensions generally correspond to noise and discarding them helps to focus on the useful signal when measuring similarities.

Figure 6:
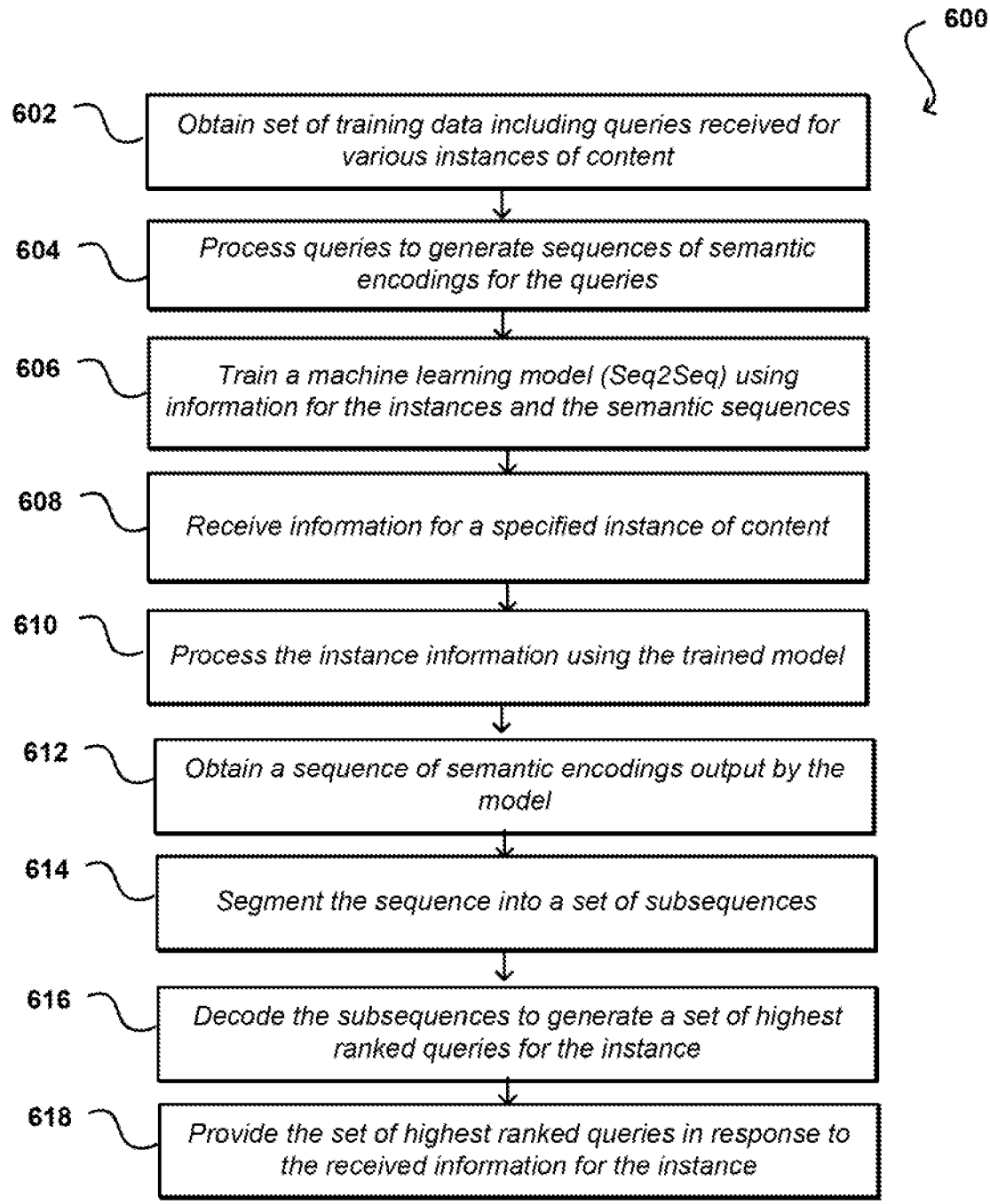
FIG. 6 illustrates an example process for performing query recommendations for an instance of content that can be utilized in accordance with various embodiments.

FIG. 6 illustrates an example process 600 for determining relevant queries for an instance of content that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a set of training data is obtained 602 that includes queries that were received from various users, as well as information for instances of content that were accessed (in at least one of a number of different ways discussed and suggested herein) in response to results provided for those queries, although other types of information can be included in such a training set as well in various embodiments. As mentioned, in other examples the information may include an input sequence of actions, content, or other such information as discussed and suggested herein. The data set may be very large, and may include a large variety of potentially complex queries, which may not be practical to process using conventional approaches. In this example, the queries in the data set (in some embodiments queries that were received at least with a minimum frequency or number over a period of time), are processed 604, using a semantic-aware hash function in this example as discussed elsewhere herein, to generate a set of sequences of semantic encodings. This can include, in some embodiments, generating a set of semantic codes for individual queries (or other such labels) using an encoding approach such as random forest encoding. In some embodiments a count of the number of items associated with a specific query can be determined and used go generate a set of feature vectors, and hashing can be performed using those vectors to generate the encodings, with semantic information being retained in the hashes. In some embodiments a projection of the vectors can be used to generate a low dimensional encoding. These encodings can then be concatenated into a sequence of semantic encodings for the respective queries. The information for the instances of content, as well as the semantic sequences, can be used to train 606 a machine learning model, such as a sequence to sequence (Seq2Seq) model. In at least some embodiments, sequences of semantic encodings can be generated for the instance information as well, such as where the information relates to a title or description for an instance of content, as may relate to a physical item in some embodiments. Once the training has completed, such as when a specified convergence criterion has been satisfied, the trained model can be provided for classifying unclassified data. In this example, this can include determining queries related to instances of content based at least in part upon information provided for those instances.

Subsequently, information can be received 608 for a specified instance of content. As discussed, this information can include textual information relating to a title or description, among other such options. The request might be received from an entity that is attempting to determine the most likely queries to be submitted for users looking for content of a specific instance type. The entity can then use this information for purposes such as to bid on specific terms or queries for sponsored advertisements, determine how to describe or label content, or other such purposes. The instance information can be processed 610 using the trained model. As mentioned, in some embodiments the instance information can be converted into a sequence of semantic encodings before being processed by the model. At least one output sequence of semantic encodings can be obtained 612 from the trained model. The output sequence can then be segmented 614 into various subsequences, which can then be decoded 616 using an appropriate decoding process, as may relate to the random tree encoding process discussed above. As part of the decoding process, a set of highest ranked queries can be generated, such as may relate to a set of top-k predictions. The set of highest ranked queries can then be provided 618 in response to the received information for the specified instance. In some embodiments a confidence or loss value may be obtained as well, which may be provided with the relevant queries in order to determine a relevant likelihood or frequency of each query being received, for example, which can be used by the entity to determine factors such as bid prices or numbers of bids for sponsored content.

Figure 7:
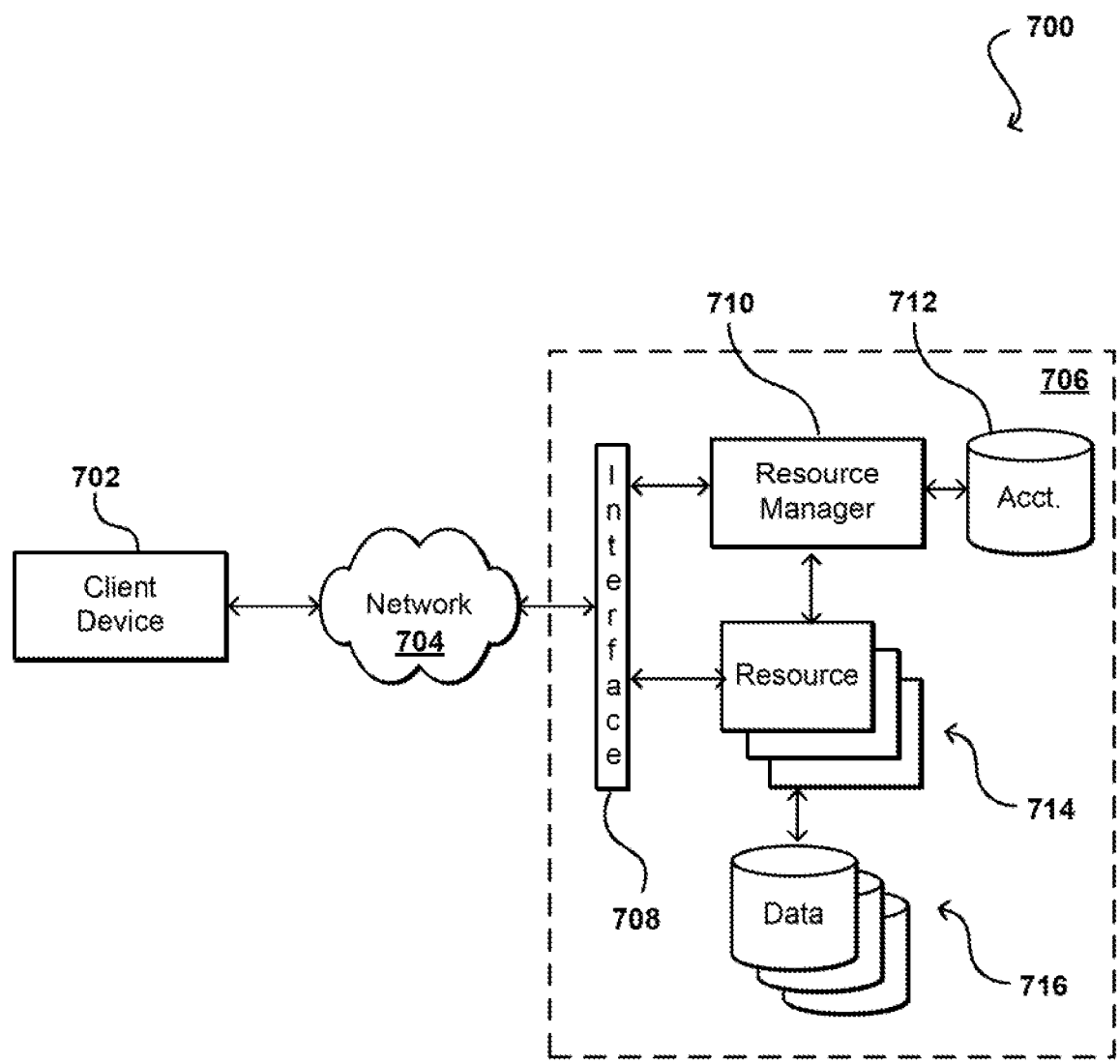
FIG. 7 illustrates an example system that can be used to implement aspects of the various embodiments.

FIG. 7 illustrates an example environment 700 in which aspects of the various embodiments can be implemented. In this example a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 8:
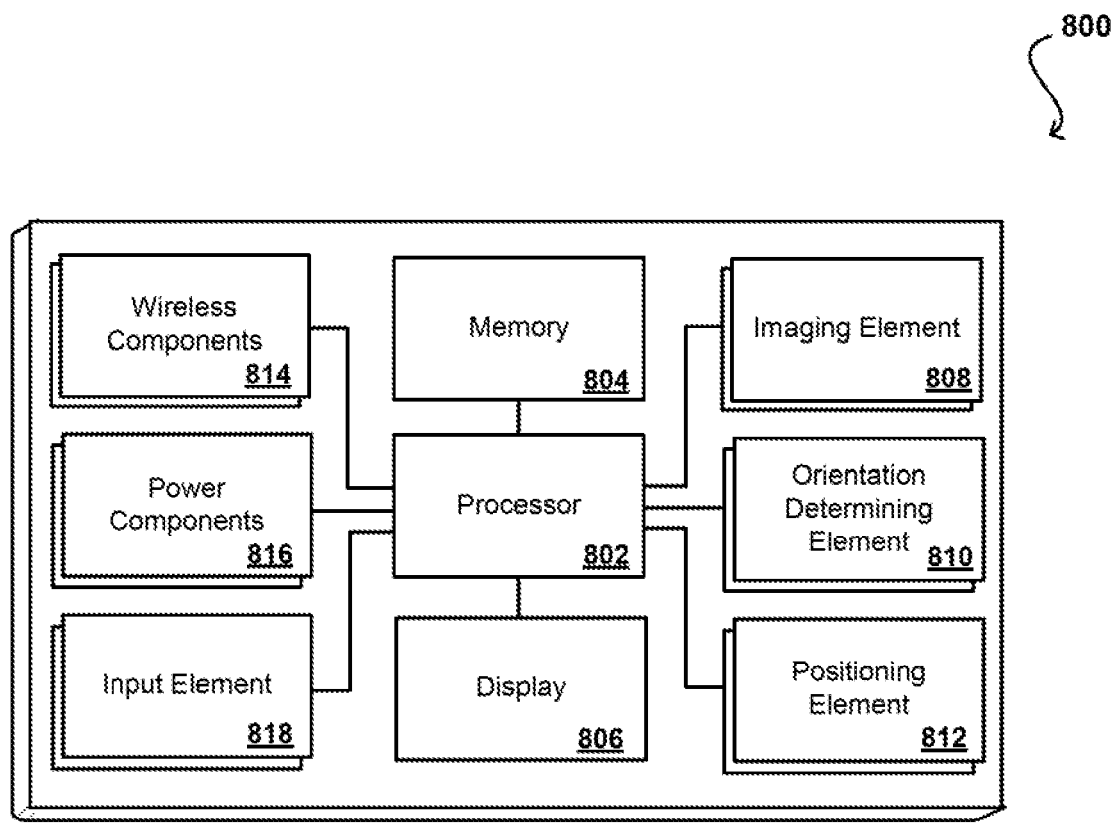
FIG. 8 illustrates example components of an example computing device that can be utilized in accordance with various embodiments.

FIG. 8 illustrates a set of basic components of an electronic computing device 800 that can be utilized to implement aspects of the various embodiments. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
obtaining a set of training data including multiple types of inputs and at least one corresponding content item, the at least one corresponding content item including received queries and descriptive information for relevant content;
processing the training data to generate sequences of semantic encodings;
training a sequence-to-sequence based machine learning model using the sequences of semantic encodings, wherein the trained machine learning model is trained to receive a sequence of semantic encodings of content as input and provide semantic encodings of queries that return the relevant content as output;
receiving descriptive information for a specified instance of content;
generating an input sequence of semantic encodings for the specified instance using the descriptive information, wherein at least one aspect of the input sequence is distinct from the specified instance;
processing the input sequence of semantic encodings using the machine learning model to obtain an output sequence of semantic encodings;
decoding the output sequence to obtain set of relevant queries;
providing at least a subset of the relevant queries to an entity associated with the item;
receiving, from the entity, indication of a selected query of the subset; and
causing the specified instance of content to be provided in response to subsequently receiving the selected query from a user.

2. The computer-implemented method of claim 1, further comprising:
generating the sequences of semantic encodings using subsets of the received queries and descriptive information.

3. The computer-implemented method of claim 1, further comprising:
decoding the output sequence after segmenting the output sequence into a set of subsequences.

4. The computer-implemented method of claim 3, further comprising:

generating a set of top-k predictions as the set of relevant queries.

5. The computer-implemented method of claim 1, wherein the descriptive information for the relevant content includes title information for a physical item associated with the relevant content.

6. A computer-implemented method, comprising:
obtaining a set of training data including multiple types of inputs, the multiple types of inputs including input sequences corresponding to related content;
processing the training data to generate training sequences of semantic encodings;
training the machine learning model using the training sequences of semantic encodings;
receiving an input sequence corresponding to an instance of the content;
generating a first set of semantic encodings representative of the input sequence, wherein at least one aspect of the first set of semantic encodings is distinct from the instance;
processing the first set of semantic encodings using the trained machine learning model to obtain an second set of semantic encodings output from the trained machine learning model, the machine learning model trained to receive a sequence of semantic encodings of content as input and provide semantic encodings of queries that return the relevant content as output; and
decoding the second set of semantic encodings to obtain a set of output sequences relevant to the received input sequence.

7. The computer-implemented method of claim 6, further comprising:
generating the first set of semantic encodings using subsets of the input sequence.

8. The computer-implemented method of claim 7, further comprising:
generating the first set of semantic encodings using a semantic-aware hash function.

9. The computer-implemented method of claim 7, further comprising:
decoding the output sequence in part by segmenting the output sequence into a plurality of subsequences.

10. The computer-implemented method of claim 6, further comprising:
generating a set of top-k predictions as the set of output sequences.

11. The computer-implemented method of claim 6, further comprising:
receiving indication of a selected output sequence of the set of output sequences; and
causing the instance of content to be provided in response to subsequently receiving the selected output sequence.

12. The computer-implemented method of claim 6, further comprising:
determining the input sequence corresponding to the instance of content, the input sequence including a text string related to at least one of a title, a description, a review, or an article relating to a topic of the instance.

13. The computer-implemented method of claim 6, wherein input sequences have yet to be received that are associated with the instance of content.

14. A system, comprising:
at least one processor; and
memory storing instructions that, when executed by the at least one processor, cause the system to:
obtain a set of training data including multiple types of inputs, the multiple types of inputs including input sequences corresponding to related content;
process the training data to generate training sequences of semantic encodings;
train the machine learning model using the training sequences of semantic encodings;
receive a text string describing an instance of the content;
generate an input sequence of semantic encodings representative of the text string, wherein at least one aspect of the input sequence of semantic encodings is distinct from the instance;
process the input sequence using the trained machine learning model to obtain an output sequence of semantic encodings, the machine learning model trained to receive a sequence of semantic encodings of content as input and provide semantic encodings of queries that return the relevant content as output; and
decode the output sequence to obtain a set of queries relevant to the received text string describing the instance of content.

15. The system of claim 14, wherein the instructions when executed further cause the system to:
generate the semantic encodings using subsets of the text string.

16. The system of claim 15, wherein the instructions when executed further cause the system to:
decode the output sequence after segmenting the output sequence into a plurality of subsequences.

17. The system of claim 14, wherein the instructions when executed further cause the system to:
generate a set of top-k predictions as the set of queries.

18. The system of claim 14, wherein the instructions when executed further cause the system to:
receive indication of a selected query of the set of queries; and
cause the instance of content to be provided in response to subsequently receiving the selected query.

* * * * *